United States Patent
Deligny et al.

(10) Patent No.: US 7,040,647 B2
(45) Date of Patent: May 9, 2006

(54) MOUNTING AN INFLATABLE ELEMENT

(75) Inventors: Yann Deligny, Compiegne (FR); Paul Short, Hamsphire (GB); James Hinton, Hamsphire (GB)

(73) Assignee: Forrester Ketley & Co., London (GB)

( * ) Notice: Subject to any disclaimer, the term of this patent is extended or adjusted under 35 U.S.C. 154(b) by 299 days.

(21) Appl. No.: 10/381,960

(22) PCT Filed: Sep. 28, 2001

(86) PCT No.: PCT/SE01/02094

§ 371 (c)(1),
(2), (4) Date: Aug. 11, 2003

(87) PCT Pub. No.: WO02/28690

PCT Pub. Date: Apr. 11, 2002

(65) Prior Publication Data

US 2004/0012172 A1   Jan. 22, 2004

(30) Foreign Application Priority Data

Oct. 3, 2000  (GB) .................................. 0024173

(51) Int. Cl.
*B60R 21/16* (2006.01)

(52) U.S. Cl. .............................. 280/728.2; 280/730.2; 24/293; 24/458

(58) Field of Classification Search ............. 280/728.2, 280/730.2; 24/293–295, 458
See application file for complete search history.

(56) References Cited

U.S. PATENT DOCUMENTS

| 5,603,524 A | 2/1997 | Barnes et al. | |
| 6,049,963 A * | 4/2000 | Boe | 29/525.01 |
| 6,217,061 B1 * | 4/2001 | Harland et al. | 280/730.2 |
| RE38,125 E * | 5/2003 | Shibata et al. | 280/730.2 |

FOREIGN PATENT DOCUMENTS

| EP | 0 855 316 | 6/2003 |
| GB | 1050416 | 12/1966 |
| WO | WO-99/51457 | 10/1999 |

* cited by examiner

*Primary Examiner*—Paul N. Dickson
*Assistant Examiner*—Drew Brown
(74) *Attorney, Agent, or Firm*—Madson & Austin

(57) ABSTRACT

A clip (12) is provided to engage and retain an aperture formed in part of an inflatable element. The clip has means (25, 26) to engage an aperture region of the inflatable element, and also means (17, 18, 19) to engage an aperture formed in a vehicle body to retain the clip in position on the vehicle body.

20 Claims, 4 Drawing Sheets

MOUNTING AN INFLATABLE ELEMENT

BACKGROUND OF THE INVENTION

1. Field of the Invention

The present invention relates to an arrangement for mounting an inflatable element such as, for example, an inflatable element adapted to form an inflatable side curtain in a motor vehicle.

2. Description of Related Art

It has been proposed previously to provide an inflatable element which, on inflation, forms a side curtain within a motor vehicle. Such a side curtain may be intended to provide protection for a driver or occupant of the vehicle in the event that a side impact should occur. An inflatable element of this type is shown, for example, in GB 2297950A.

An inflatable element of this type has an upper edge which is to be fixed to part of a car body, and which typically is to be fixed to part of a car body that is formed of sheet metal.

Various techniques are being used to mount the inflatable element to a car body, and the present invention relates to an improved arrangement for fixing an inflatable element in position.

SUMMARY OF THE INVENTION

According to this invention there is provided an arrangement for fixing an inflatable element to part of a motor vehicle body, the arrangement comprising a clip element, the clip element having a portion adapted to engage and retain an apertured region of the inflatable element, and the clip element having means adapted to engage at least one aperture formed in a vehicle body to retain the clip in position on the vehicle body.

Preferably the plate-like element is provided with a first finger to comprise the means to engage one aperture formed in the car body and also being provided with a protruding lug adapted to engage an aperture formed in the car body.

Conveniently the first finger is a depending finger and the plate is provided, in addition to the first finger, with an upstanding finger also adapted to be entered into the said one aperture in the car body.

Alternatively the first finger is an extending finger and has an upwardly directed snap action resilient lug to lock the finger to the aperture.

Conveniently the finger engages a first aperture and the lug engages a second aperture in the car body.

Advantageously said portion of the clip includes a projecting part having a stem and an enlarged head, the enlarged head being adapted to be inserted through the aperture formed in said apertured region of the inflatable element.

Conveniently the width of the stem is approximately the same as the width of the aperture.

Advantageously the plate-like element is a vertical plate, the vertical plate carrying a projecting horizontal flange, part of the edge of the flange extending away from the plate being cut-away, said portion being formed within the cut-away part of the flange.

Conveniently a slot is formed between the plate and the flange, the arrangement being such that the apertured region of the inflatable element engages the clip by passing through the slot and extending across part of the flange to engage the projection.

The arrangement may include a plurality of said clip elements.

Conveniently at least some of the clip elements are provided with two sets of said fingers and lugs.

Preferably the inflatable element is in the form of an inflatable side curtain to be mounted to a car body above one or more door openings within the car body. The invention also relates to an inflatable element provided with an arrangement for fixing the inflatable element as described above.

In order that the invention may be more readily understood, and so that further features thereof may be appreciated, the invention will now be described, by way of example, with reference to the accompanying drawings in which

DETAILED DESCRIPTION OF THE INVENTION

Figure 1:
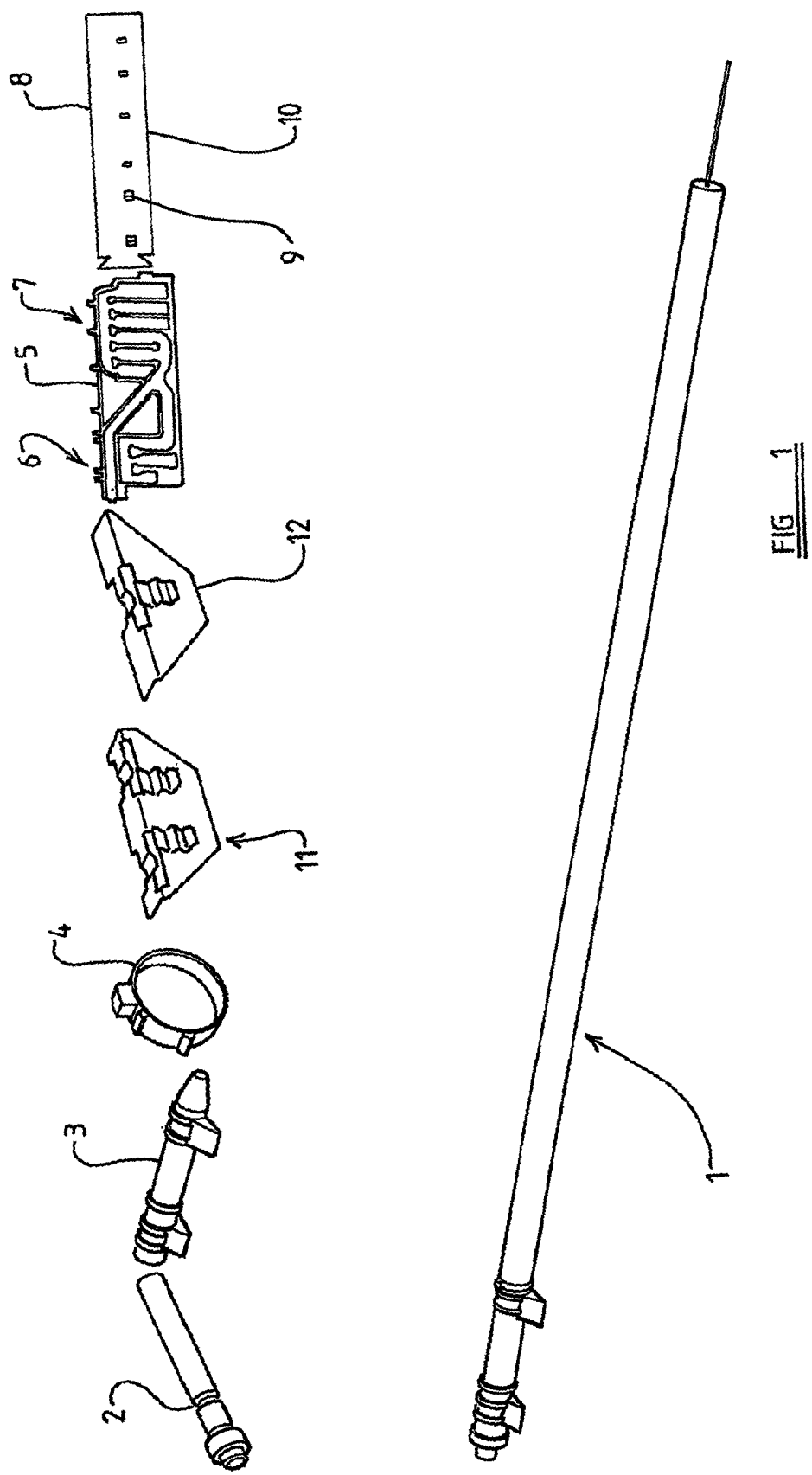
FIG. 1 is a view illustrating an assembly adapted to be mounted within a motor vehicle incorporating an inflatable element, showing the components of the assembly, on various scales, diagrammatically.

Turning initially to FIG. 1 of the accompanying drawings an inflatable element adapted to form an inflatable curtain may be supplied within a complete package or unit 1. The package or unit 1 is of elongate form. The package or unit incorporating a generally cylindrical inflator 2, adapted to generate gas, which is mounted within a cylindrical diffuser 3 which is connected, by means of a clip or collar 4, to a gas duct that forms part of an inflatable element 5. The inflatable element 5 is provided, at its upper edge, with a plurality of protruding lugs, including two pairs 6 of protruding lugs and four unitary protruding lugs 7. Each lug is provided with an aperture therein. A flexible envelope or cover 8 is provided which is adapted to pass over the folded inflatable element 5 and the associated gas generator 2 and diffuser 3. The cover 8 is provided with apertures 9,10 therein, the apertures being positioned to be located adjacent the lugs 6 and 7 as described above so that the lugs pass through the apertures. The lugs are adapted to engage with clips such as the clip 11, which is adapted to engage with a pair of lugs 6 and the clip 12 which is adapted to engage with a single lug 7. Two clips 11 are provided and four clips 12 are provided.

The clip 12 will be described hereinafter in detail, but it is to be appreciated that the clip 11 is simply a "double" version of the clip 12.

Figure 2:
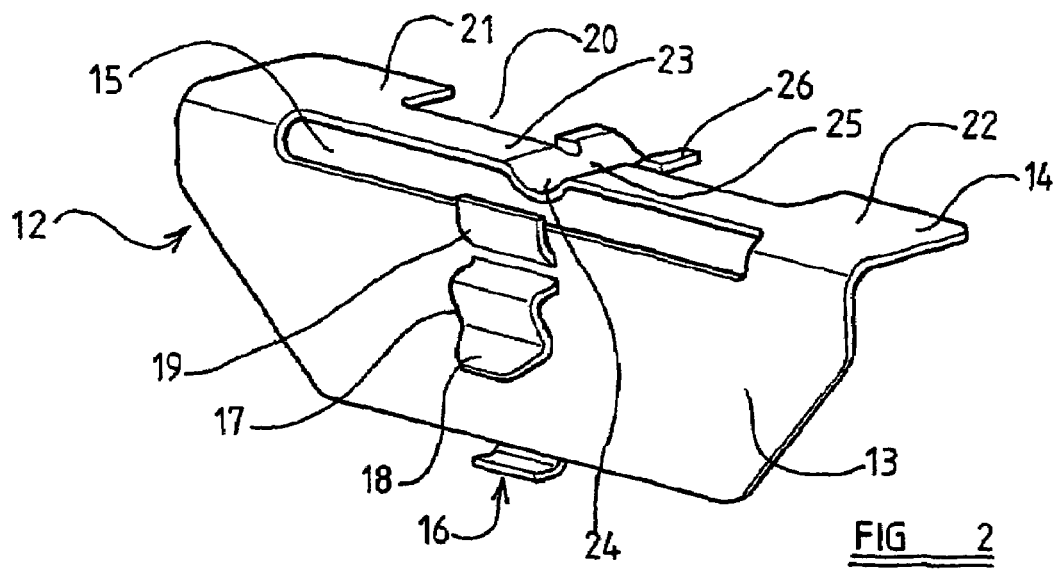
FIG. 2 is a perspective view of a clip shown in FIG. 1.

Referring now to FIG. 2 of the accompanying drawings the clip 12 comprises a vertical plate 13 carrying, at its upper edge, a horizontally extending flange 14, which extends to one side, the front side, of the plate 13. An elongate slot 15 is provided, which is centrally located in the region between the vertical plate 13 and the horizontal flange 14. Thus the plate 13 is connected to the flange 14 by two curved regions located on either side of the slot 15.

At the lower edge of the vertical plate 13 there is a rearwardly protruding lug 16 which extends rearwardly of the plate 13, that is to say on the opposite side of the plate 13 to the flange 14.

Located above the lug 16, but beneath the slot 15, on the rear face of the plate 13, is an outwardly and downwardly extending resilient finger 17 which terminates with an outwardly and downwardly directed tab 18. Located immediately above the finger 17 is an upwardly and outwardly directed finger 19 which is of lesser extent than the downwardly directed finger 17.

The edge of the flange 14 which is spaced away from the vertical plate 13 is cut away to form a rectangular recess 20 which is symmetrically arranged and which is substantially aligned with the slot 15. The recess 20 divides the flange 14 into two terminal regions 21,22 of a full width and a lesser-width bridge 23 extending between the terminal regions adjacent the slot 15. The central portion of the bridge 23 is depressed to form a valley 24. In the region of this valley 24 there is a forwardly extending projection which extends into the recess 20, the projection having an initial stem portion 25 which has a width substantially equal to the width of the valley 24, which terminates with a head 26 of greater width. The projection is thus of "mushroom" form, but it is to be observed that the valley 24 extends across the stem portion 25 of the projection and also extends across the central region of the head 26.

The clip may be formed of any appropriate material such as spring steel.

Figure 3:
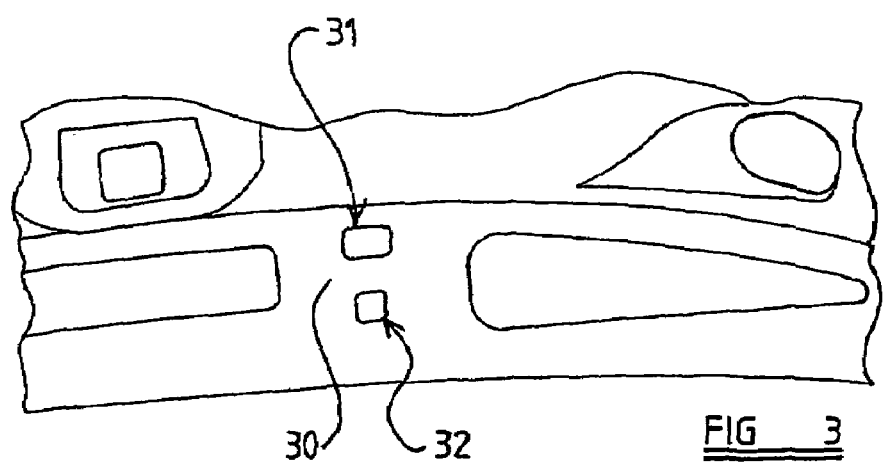
FIG. 3 is a perspective view of part of the motor vehicle showing a mounting position for the clip of FIG. 2.

It is to be appreciated that the clip is to be mounted in position within a motor vehicle. FIG. 3 illustrates part of a motor vehicle showing a post 30 provided within the roof of the vehicle. A relatively large aperture 31 is formed in the sheet metal forming the front of the post 30 and a small aperture 32 is provided located beneath the large aperture 31. The clip 13 may be fitted in position within the motor vehicle by inserting the finger 17 into the aperture 31 with a downward movement of the clip. The clip may be moved downwardly so that the lower edge of the aperture 31 is received adjacent the upper part of the finger 17 which is secured to the vertical plate 13. In this position the lug 16 is located beneath the aperture 32, but the upwardly directed finger 19 may be inserted into the upper part of the aperture 31. The lower finger 17 is resiliently deformed at this stage but if the clip is moved upwardly the lug 16 will become aligned with the aperture 32 and the resilient bias applied to the plate 13 by the finger 17 will force the lug 16 into the aperture 32. The clip is thus retained securely in position although, it is to be appreciated, the clip may be mounted in position relatively easily without undue skill being required.

The clip 12 is adapted to be mounted to a lug of the inflatable element 5, such as a lug 7.

Figure 4:
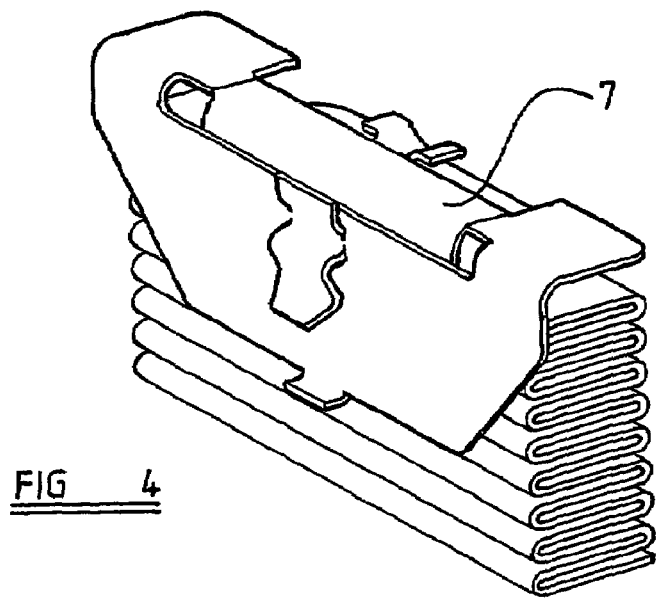
FIG. 4 is a perspective view of the rear showing the clip and part of an inflatable element.
Figure 5:
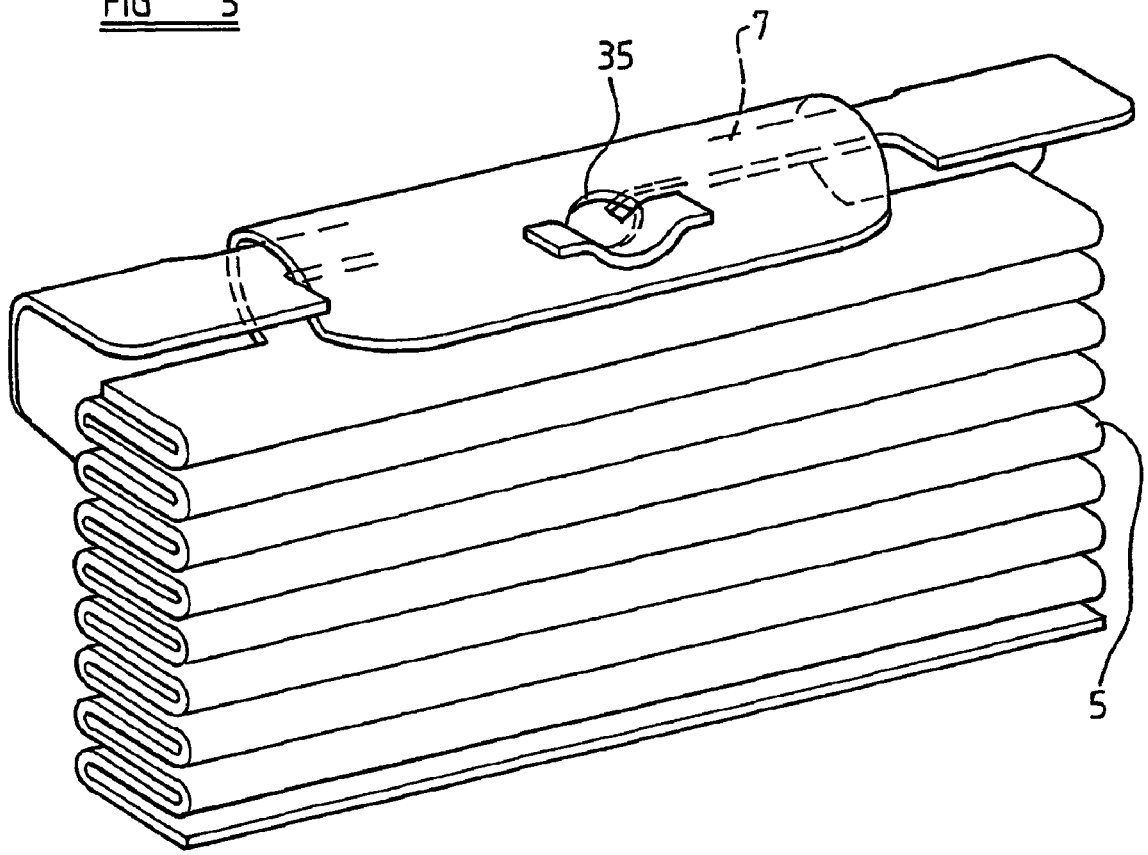
FIG. 5 is a perspective view from the front showing the clip and part of an inflatable element.
Figure 6:
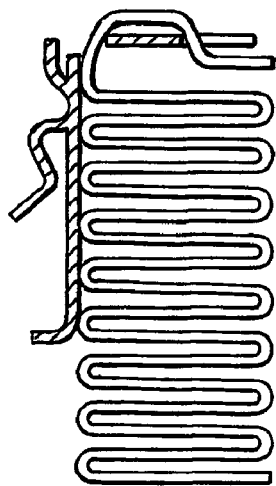
FIG. 6 is an end view showing the clip and part of an inflatable element.

Referring to FIGS. 4 and 5 it is to be appreciated that the inflatable element 5 is retained within the flexible cover 8 in a folded state. The cover is not shown in FIGS. 4 and 5. A lug 7 passes, from the folded inflatable element 5 from part of the clip adjacent the from face of the vertical wall 13, through the slot 15 and then extends forwardly above the bridge element 23, the lug 7 then being folded downwardly so that the head 26 of the projection that extends into the recess 20 passes through an aperture 35 is formed in the lug 7. The width of the stem portion 25 of the projection is substantially equal to the width of the aperture 35, and thus the width of the head 26 of the projection is greater than the width of the aperture 35. The lug 7 is thus securely connected to the clip in a straightforward manner.

It is to be appreciated that each of the lugs 7 provided on the inflatable element 5 will be provided with a respective clip 12 of the type as described above and each of the pairs of lugs 6 provided on the inflatable element 5 will be provided with a double clip 11 of the type shown in FIG. 1. Apertures, such as the above described apertures 31 and 32 will be provided at appropriate positions within the body of a motor vehicle to receive the clips 11 and 12, thus enabling the inflatable element to be mounted accurately and securely in position in a straightforward manner.

It is to be appreciated, at this stage, that the clip 11 is a "double" version of the clip 12 thus having two "sets" of co-operating fingers and lugs corresponding to the fingers 17 and 19 and the lug 16.

Turning now to FIGS. 7 to 10, a further form of clip, 40, that may be used in embodiments of the invention will now be described.

The clip 40 is, in many ways, similar to the clip 12 in that the clip 40 comprises a vertical plate 41 which carries, at its upper edge, a horizontally extending flange 42. The flange 42 extends to one side, the front side, of the vertical plate 41. An elongate slot 43 is provided, which is centrally located in the region between the vertical plate 41 and the horizontal flange 42. Thus the vertical plate 41 is connected to the horizontal flange 14 by two curved regions 44, 45 located on either side of the slot 15. The curved regions 44, 45 are dimpled by way of reinforcement.

At the lower-most edge of the vertical plate 41, which is of generally triangular form, there is a rearwardly protruding lug 46, which extends rearwardly of the plate 41, that is to say on the opposite side of the plate 41 to the flange 42. The lug 46 extends rearwardly and downwardly.

Located immediately above the lug 46 is a rectangular aperture 47. Extending rearwardly from the upper edge of the aperture 47 is a substantially horizontal finger 48. The finger 48 is provided with a depending forward edge 49. The central region of the finger 48 is provided with a cut-out region which defines a centrally located generally upwardly directed snap action resilient lug 49. The lug 49 is formed to be resilient, as will become clear from the following description.

The lower-most edge of the aperture 47 is deflected rearwardly, to form a spout-like projection 50.

The edge of the flange 42 which is spaced away from the vertical plate 41 is cut-away to form a rectangular recess 51, similar to the recess 20 of the clip 12, and the recess 51 is symmetrically arranged and is substantially aligned with the slot 43. The recess 51 divides the flange 42 into two terminal regions 52, 53 of a full width, and a lesser-width bridge 54 extending between the terminal regions adjacent the slot 43. The central portion of the bridge 54 is depressed to form a valley 55. In the region of this valley 55 there is forwardly extending projection which extends into the recess 51, the projection having an initial stem portion 56 which terminates with a head 57 of greater width. The projection is thus of "mushroom" form, but it is to be observed that the valley 55 extends across the stem portion 56 and also extends across the central region of the head 57.

Figures 8, 9, 10:
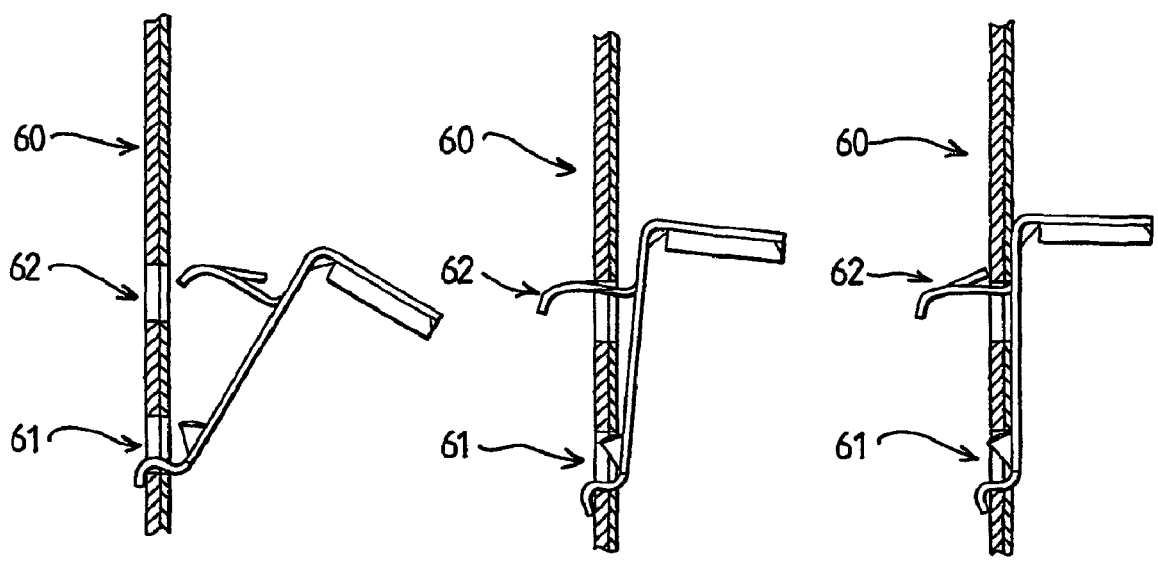

The clip 40 may be mounted in position within a motor vehicle. FIGS. 8 to 10 illustrate part of a motor vehicle showing a post 60 which is provided with a lower aperture 61, and an upper aperture 62. The clip 40 may be fitted in position within the motor vehicle by inserting the lug 46 into the lower aperture 61, and then rotating the clip about a virtual pivot point constituted by the co-operating lug 46 and lower-most edge of the aperture 61 so that the finger 48 passes into the upper aperture 62. As the finger 48 passes into the aperture 62, as shown in FIG. 9, the snap action resilient lug 49 engages the upper-most edge of the aperture 62 and is thus depressed downwardly against its resilient bias so as to be virtually co-aligned with the plane of the finger 48.

As the clip continues to move, the finger 48 becomes fully inserted into the upper aperture 62 and the snap action resilient lug returns to its initial position, thus locking the finger 48 to the aperture 62 and preventing withdrawal of the clip from the two apertures. The projection 50, during the described movement of the clip, has been received within the lower aperture 61, with the upper-most edge of the projection 50 engaging the upper-most edge of the aperture 61, thus helping to prevent any inadvertent and undesired vertical movement of the clip 40 after it has been mounted in position.

The lugs 7 of an inflatable element 5 may be connected to clips 40 in a manner similar to that described above with reference to the clips 12.

Figure 7:
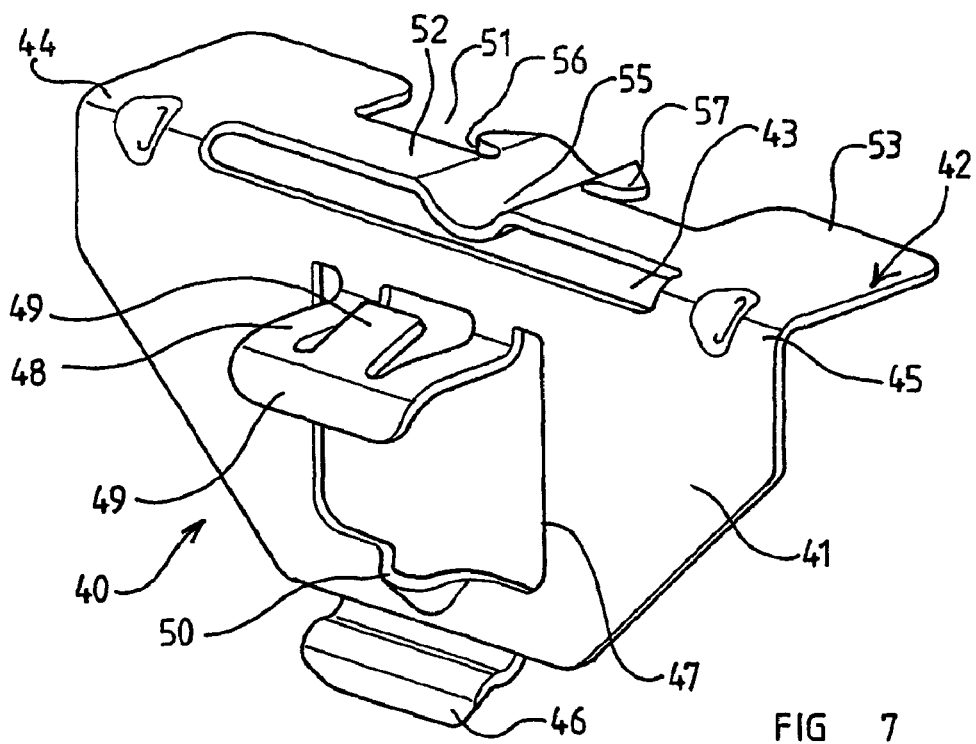
FIG. 7 is a perspective view, corresponding to FIG. 2, showing an alternative form of clip, and, FIGS. 8 to 10 are diagrammatic sectional views illustrating the mounting of the clip of FIG. 7.

In the clip of FIG. 7, only one lug and one finger are provided, but "double" forms of the clip may be provided, having two sets of co-operating lugs and fingers.

It is to be noted that in each of the described embodiments, two apertures have been provided in the body of the motor vehicle, one aperture receiving the lug and the other aperture receiving the finger. It is possible that, in a modified embodiment, a single aperture may be provided to receive the lug and the finger.

In the present Specification "comprise" means "includes or consists of" and "comprising" means "including or consisting of".

The features disclosed in the foregoing description, or the following Claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An arrangement for fixing an inflatable element to part of a motor vehicle body the arrangement comprising a clip element, the clip element including a plate carrying a portion adapted to engage and retain an apertured region of the inflatable element, and the plate having means separated from said portion which are adapted to engage at least one aperture formed in a vehicle body to retain the clip in position on the vehicle body, wherein the plate is provided with a first finger to comprise the means to engage one aperture formed in the car body and being provided with a protruding lug adapted to engage an aperture formed in the car body, wherein the finger engages a first aperture and the lug engages a second aperture in the car body.

2. An arrangement according to claim 1 wherein the first finger is a depending finger and the plate is provided, in addition to the first finger, with an upstanding finger also adapted to be entered into said one aperture in the car body.

3. An arrangement according to claim 1 wherein the first finger is an extending finger, and has an upwardly directed snap action resilient lug to lock the finger to the aperture.

4. An arrangement according to claim 1 wherein said portion of the clip element includes a projecting portion having a stem and an enlarged head, the enlarged head being adapted to be inserted through the aperture formed in said apertured region of the inflatable element.

5. An arrangement according to claim 4 wherein the width of the stem is approximately the same as the width of the aperture.

6. An arrangement according to claim 4 wherein the plate is a vertical plate, the vertical plate carrying a projecting horizontal flange, part of the edge of the flange extending away from the plate being cut-away, said portion being formed within the cut-away part of the flange.

7. An arrangement according to claim 6 wherein a slot is formed between the plate and the flange, the arrangement being such that the apertured region of the inflatable element engages the clip by passing through the slot and extending across part of the flange to engage the projection.

8. An arrangement according to claim 1 including a plurality of said clip elements.

9. An arrangement according to claim 6 wherein at least some of the clip elements are provided with two sets of said fingers and lugs.

10. An arrangement according claim 1 wherein the inflatable element is in the form of an inflatable side curtain to be mounted to a car body above one or more door openings within the car body.

11. An arrangement for fixing an inflatable element to part of a motor vehicle body the arrangement comprising a clip element, the clip element including a plate carrying a portion adapted to engage and retain an apertured region of the inflatable element, and the plate having means separated from said portion which are adapted to engage at least one aperture formed in a vehicle body to retain the clip in position on the vehicle body, wherein said portion of the clip includes a projecting portion having a stem and an enlarged head, the enlarged head being adapted to be inserted through the aperture formed in said apertured region of the inflatable element, and wherein the width of the stem is approximately the same as the width of the aperture.

12. An arrangement according to claim 11 wherein the plate is provided with a first finger to comprise the means to engage one aperture formed in the car body and being provided with a protruding lug adapted to engage an aperture formed in the car body.

13. An arrangement according to claim 12 wherein the first finger is a depending finger and the plate is provided, in addition to the first finger, with an upstanding finger also adapted to be entered into said one aperture in the car body.

14. An arrangement according to claim 12 wherein the first finger is an extending finger, and has an upwardly directed snap action resilient lug to lock the finger to the aperture.

15. An arrangement according to claim 12 wherein the finger engages a first aperture and the lug engages a second aperture in the car body.

16. An arrangement according to claim 11 wherein the plate is a vertical plate, the vertical plate carrying a projecting horizontal flange, part of the edge of the flange extending away from the plate being cut-away, said portion being formed within the cut-away part of the flange.

17. An arrangement according to claim 16 wherein a slot is formed between the plate and the flange, the arrangement being such that the apertured region of the inflatable element engages the clip by passing through the slot and extending across part of the flange to engage the projection.

18. An arrangement according to claim 11 including a plurality of said clip elements.

19. An arrangement according to claim 16 wherein at least some of the clip elements are provided with two sets of said fingers and lugs.

20. An arrangement according claim 11 wherein the inflatable element is in the form of an inflatable side curtain to be mounted to a car body above one or more door openings within the car body.

* * * * *

UNITED STATES PATENT AND TRADEMARK OFFICE
CERTIFICATE OF CORRECTION

PATENT NO.        : 7,040,647 B2
APPLICATION NO.   : 10/381960
DATED             : October 19, 2006
INVENTOR(S)       : Yann Deligny et al.

It is certified that error appears in the above-identified patent and that said Letters Patent is hereby corrected as shown below:

In item [73], please change the name of the Assignee from Forrester Ketley & Co., London (GB) to "Autoliv Development AB, Vangarda (SE)".

Signed and Sealed this

Fifth Day of December, 2006

JON W. DUDAS
*Director of the United States Patent and Trademark Office*

UNITED STATES PATENT AND TRADEMARK OFFICE
CERTIFICATE OF CORRECTION

PATENT NO.          : 7,040,647 B2
APPLICATION NO.  : 10/381960
DATED                   : May 9, 2006
INVENTOR(S)         : Yann Deligny et al.

It is certified that error appears in the above-identified patent and that said Letters Patent is hereby corrected as shown below:

In item [73], please change the name of the Assignee from Forrester Ketley & Co., London (GB) to "Autoliv Development AB, Vangarda (SE)".

This certificate supersedes Certificate of Correction issued December 5, 2006.

Signed and Sealed this

Second Day of January, 2007

JON W. DUDAS
*Director of the United States Patent and Trademark Office*